(12) United States Patent
Huang et al.

(10) Patent No.: US 10,606,656 B2
(45) Date of Patent: Mar. 31, 2020

(54) DYNAMIC COMMAND GENERATION FOR AUTOMATED CONTROL OF COMPUTING MACHINES

(71) Applicant: Microsoft Technology Licensing, LLC, Redmond, WA (US)

(72) Inventors: Wei Huang, Redmond, WA (US); Rajeswari Rajagopalan, Kirkland, WA (US); Joshua B. Bruno, Snohomish, WA (US); Zhongyuan Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/698,204

(22) Filed: Sep. 7, 2017

(65) Prior Publication Data
US 2019/0073245 A1    Mar. 7, 2019

(51) Int. Cl.
G06F 15/173    (2006.01)
G06F 9/50      (2006.01)
G06F 11/36     (2006.01)
G06F 8/30      (2018.01)
G06F 8/70      (2018.01)

(52) U.S. Cl.
CPC .............. *G06F 9/5055* (2013.01); *G06F 8/37* (2013.01); *G06F 8/70* (2013.01); *G06F 11/366* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 8,041,683 B1* | 10/2011 | Korolev | H04L 67/1097 707/672 |
| 8,438,546 B2 | 5/2013 | Wolf | |
| 9,213,841 B2 | 12/2015 | Hiar et al. | |
| 9,436,533 B2 | 9/2016 | Hermany et al. | |
| 2003/0126195 A1* | 7/2003 | Reynolds | G06F 1/14 709/203 |
| 2006/0195894 A1 | 8/2006 | Nita et al. | |

(Continued)

OTHER PUBLICATIONS

"Analyzing Crash Reports", Retrieved from <<https://developer.apple.com/library/content/documentation/IDEs/Conceptual/AppDistributionGuide/AnalyzingCrashReports/AnalyzingCrashReports.html>>, Retrieved on: May 22, 2017, 9 Pages.

(Continued)

*Primary Examiner* — Phuoc H Nguyen
(74) *Attorney, Agent, or Firm* — Fountainhead Law Group P.C.

(57) ABSTRACT

A system generates a command to cause a computing machine to collect information for an issue that occurred with an application. The command is stored in a command list and associated with a computing machine identifier for the computing machine. The system receives a query from the computing machine for the command list. The query includes the computing machine identifier and the system locates the command in the command list based on the command being associated with the computing machine identifier. The system then sends the command to the computing machine where the command dynamically causes the computing machine to collect the information for the issue with the application.

20 Claims, 7 Drawing Sheets

(56) References Cited

U.S. PATENT DOCUMENTS

| | | | |
|---|---|---|---|
| 2008/0066080 A1* | 3/2008 | Campbell | G06F 16/958 |
| | | | 719/314 |
| 2008/0228863 A1* | 9/2008 | Mackey | G06F 11/3409 |
| | | | 709/203 |
| 2009/0106219 A1* | 4/2009 | Belknap | G06F 16/24542 |
| 2011/0238792 A1* | 9/2011 | Phillips | G06F 15/177 |
| | | | 709/220 |
| 2013/0012231 A1* | 1/2013 | Hall | H04W 4/021 |
| | | | 455/456.2 |
| 2016/0077910 A1 | 3/2016 | Dev | |
| 2016/0224619 A1* | 8/2016 | Robichaud | G06F 16/2428 |
| 2016/0224642 A1* | 8/2016 | Miller | G06F 16/2372 |
| 2017/0083390 A1* | 3/2017 | Talwadker | G06F 11/079 |
| 2017/0083399 A1 | 3/2017 | Smirnov | |
| 2017/0123956 A1 | 5/2017 | Lindo et al. | |
| 2017/0310537 A1* | 10/2017 | Henry | H04L 41/069 |
| 2018/0314734 A1* | 11/2018 | James | G06F 9/4881 |

OTHER PUBLICATIONS

"Client-side log capture", Retrieved from <<https://www.ibm.com/support/knowledgecenter/SSZH4A_6.2.0/com.ibm.worklight.dev.doc/devref/c_client-side_log_capture.html>>, Retrieved on: May 22, 2017, 4 Pages.

"OS X Yosemite: Report problems to Apple", Retrieved from <<https://support.apple.com/kb/PH18763?locale=en_US>>, Sep. 23, 2015, 3 Pages.

\* cited by examiner

DYNAMIC COMMAND GENERATION FOR AUTOMATED CONTROL OF COMPUTING MACHINES

BACKGROUND

Issues may occur while users are using applications, such as an application quits quickly after the application launches. A provider may then receive feedback on the issues. For example, users may report issues via a tool dedicated for providing feedback. However, most of the feedback received is not actionable because the provider does not have any logs regarding the issue. Also, the provider may receive reports from applications that are experiencing the issues. However, these issues are still not actionable because no logs are received when the issue is reported by the application.

DETAILED DESCRIPTION

Figure 1:
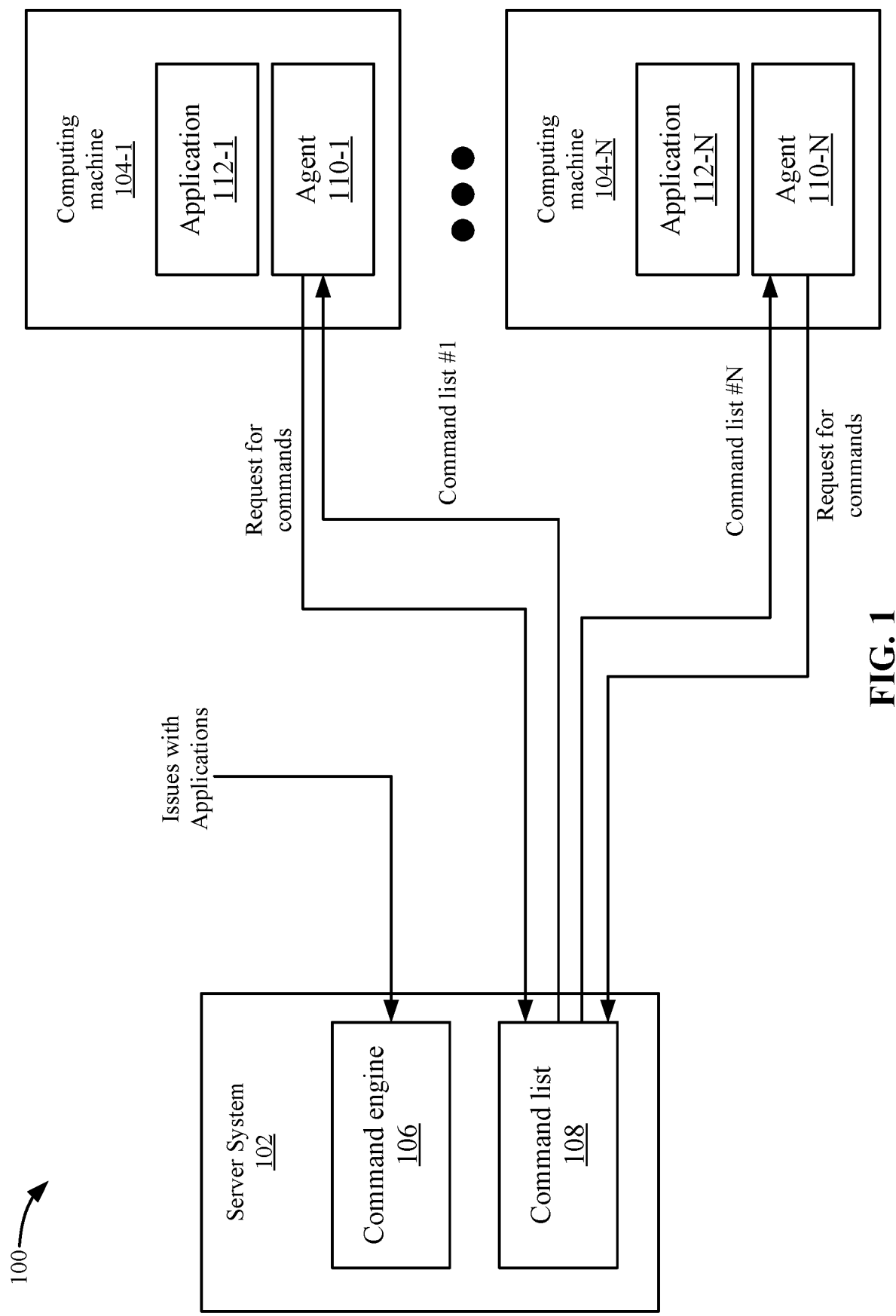
FIG. 1 depicts a simplified system for automatically collecting telemetry information according to some embodiments.

A server system may receive information for issues that occurred for applications. For example, the server system may receive a computing machine identifier (ID) for a computing machine that is running an application and the application name for the application that is experiencing the issue. The server system can then dynamically initiate a collection of telemetry information for the application. For example, the server system may generate a command, such as a telecommand, that remotely configures the computing machine to collect telemetry information for the application for the issue. However, the server system may not push the command to the computing machine. Rather, the server system may store the command in a pending command list.

The server system may not push the commands to the computing machine because, in some examples, the server system may not be able to connect to the computing machine since the server system only received the machine ID and application name of the application experiencing the issue. However, the computing machine is configured to query the server system for any commands associated with the computing machine in the pending command list. For example, the computing machine may query the server system periodically, such as once a day, every 12 hours, every hour, etc. The query may include the computing machine identifier, which allows the server system to locate any commands in the pending command list that are associated with the computing machine ID. The server system retrieves the commands and sends the commands to the computing machine. A command may include information to configure the computing machine to collect telemetry information for the application, such as the computing machine identifier, application name, a command name, and other parameters that are needed to execute the command. The computing machine can then execute the command, which may cause the computing machine to perform one or more actions that collects telemetry information for the application.

Some examples of telemetry information may include log file information, which may be as log files for the operating system in which the application is running, or the application log files. Additionally, the computing machine may turn on a runtime agent to monitor the application when the application is launched. The runtime agent may then collect runtime information from the application or operating system. The computing machine then returns the collected telemetry information to the server system.

The use of the pending command list allows the server system to dynamically change the operation of the computing machine and define what telemetry information the computing machine collects. For example, the command dynamically changes what the computing machine collects as telemetry information upon receiving the command. The telemetry information can then be used to improve the operation of the application, but may not specifically troubleshoot the current issue on the computing machine. Also, in some embodiments, the identity of the user is not collected; rather, the server system knows the computing machine ID. This allows the server system to keep the user identity anonymous, but still cause the computing machine to collect the telemetry information.

Overview

FIG. 1 depicts a simplified system 100 for automatically collecting telemetry information according to some embodiments. System 100 includes a server system 102 and computing machines 104-1 to 104-N. Server system 102 may be implemented in any number of computing devices and it will be understood that functions that are described may be distributed across multiple computing devices or be performed on a single computing device. Computing machines 104 may be computing devices, such as personal computers, mobile devices, tablet devices, or other types of computing devices that can execute applications 112-1 to 112-N.

Applications 112 may be an application running on an operating system, may be the operating system itself, or may be combination of both an application running on an operating system. In some embodiments, the operating system may be developed and owned by a provider operating server system 102 and the application running on the operating system may or may not be owned by the provider. Also, it will be understood that application 112 may be running on computing machine 104 or be running remotely from computing machine 104. Different computing machines 104 may also be executing different applications 112.

During the execution of applications 112, issues may occur. For example, the issues may include an application closing quickly after being launched, operating slowly, or other problems that a user or the application may experience. In some embodiments, the issues that occur may be different from a crash, which may be when the application stops functioning and exits. A crash reporting service may report the crash and any details relating to it. This report may include a user ID with the report. However, when an issue occurs with applications in the present environment, command engine 106 receives a report of the issue with an indication of a machine ID and application name, but may not receive a user ID. In some embodiments, command engine 106 does not receive the user ID or any indication of the identity of the user that was using computing machine 104 with the report of the issue. The report for the issue keeps the user anonymous. However, the user ID may be received in some embodiments. Also, in some embodiments, command engine 106 receives an indication of the issue that occurred, such as the description of the issue is that an application closed very soon after startup. However, in other embodiments, command engine 106 does not receive an indication of what problem has occurred. That is, the report only states that application 112 is having issues, but does not identify the issue.

Command engine 106 may receive the issues in different ways. For example, users may report issues via a feedback tool (e.g., a feedback interface or page), which may be separate from application 112. The feedback tool may not provide any logs, but just an indication of the issue that is occurring with the machine ID and application name. Also, the operating system or application may send a description of the issue with the machine ID and application name to command engine 106. In some embodiments, the operating system or application may not send any logs when the description of the issue is sent.

Command engine 106 can then automatically evaluate the issues and generate a command for computing machines 104. The command may be a telecommand, which may be a command that remotely controls computing machines 104 to perform some action. Command engine 106 then stores the commands in a pending command list 108. The commands may cause computing machines to collect telemetry information, which may be any information that is collected by computing machines 104 and sent to server system 102. Because command engine 106 does not push the commands, at some point, computing machines 104 send requests for commands to server system 102. Server system 102 then determines which commands correspond to which computing machines 104, and sends the respective commands to computing machines 104, such as a command list #1 to computing machine #1 and a command list # N to computing machine # N.

Command Generation

Figure 2:
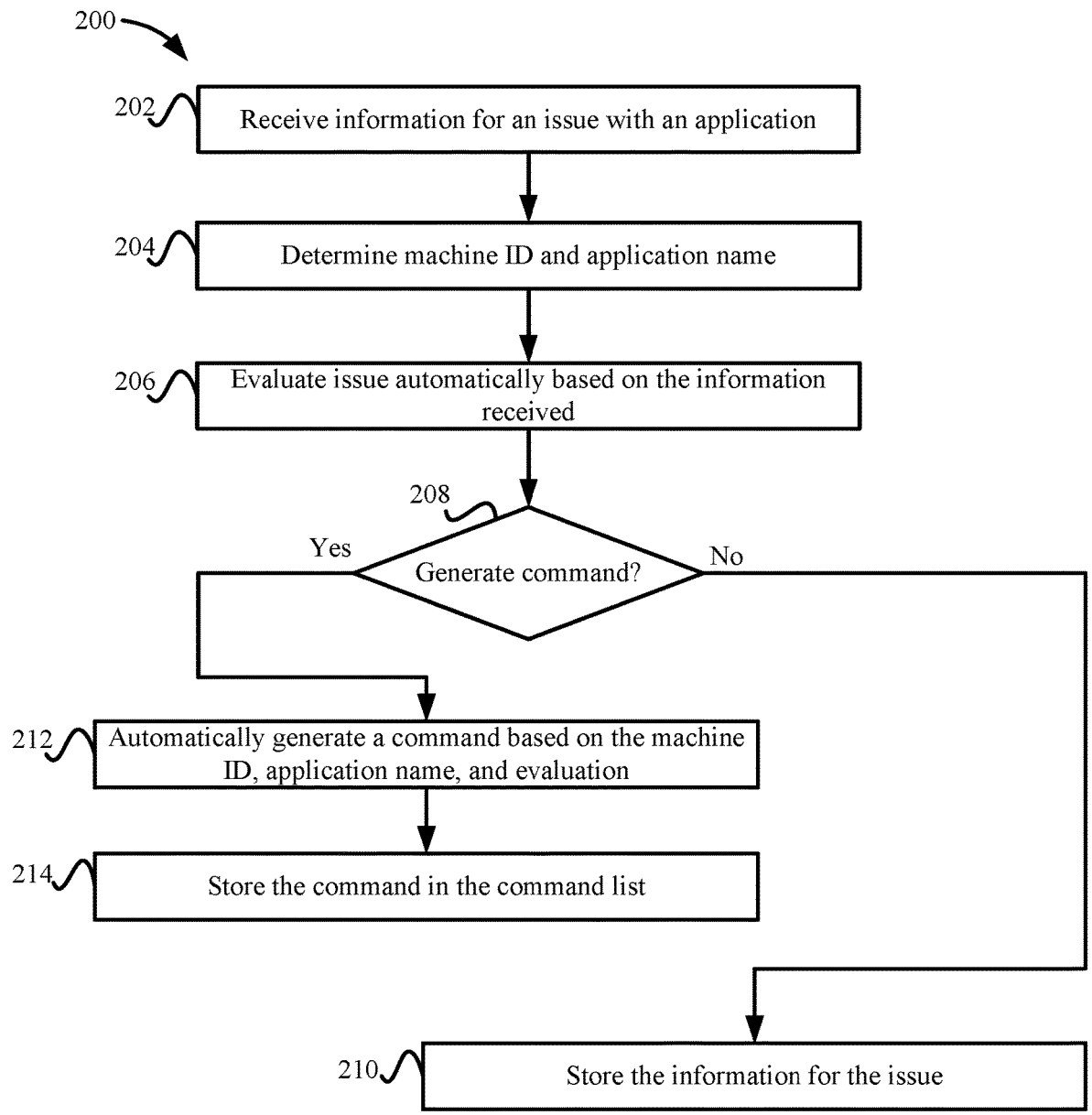
FIG. 2 depicts a simplified flowchart of a method for generating commands according to some embodiments.

FIG. 2 depicts a simplified flowchart 200 of a method for generating commands according to some embodiments. At 202, command engine 106 receives a report for an issue that occurred at an application 112. The information may be received as discussed above, such as through a feedback tool or from the application 112. At 204, command engine 106 determines a machine ID and application name for the issue. For example, the report may include the machine ID and application name, but not identification information for the user associated with computing machine 104.

At 206, command engine 106 evaluates the issue automatically based on the received report. For example, the report may also include a description of the issue that occurred. However, the issue may not include logs from the specific machine that experienced the issue. Rather, the identification of the issue is included in the report. Command engine 106 may parse the report and apply rules to the information in the report. The rules may include arguments and corresponding actions to take, if any. An example of a rule may be if issue # X occurs N times, generate command # X.

Based on applying the rules, at 208, command engine 106 determines whether or not to generate a command for the issue. For example, command engine 106 may not cause telemetry information to be collected on computing machines for all issues that are received. As discussed above, server system 102 may evaluate and improve the operation of application 112. That is, server system 102 is not resolving the current issue on just the computing machine in which the issue occurred. Rather, information received from computing machines 104 may be used to globally improve application 112. Accordingly, not every issue may cause a command to be generated. For example, the issue may have to occur a number of times that is above a threshold. This threshold may be applied either globally across multiple computing machines 104 that are using application 112 or may have to occur on the specific computing machine a number of times. Also, it is noted that a single occurrence of an issue may also trigger the generation of a command.

If a command should not be generated, then at 210, command engine 106 stores the information for the issue. For example, the machine ID and application name may be stored for the issue. This information may be later used in evaluations on whether to generate commands for currently received issues or in any evaluation of application 112.

If a command should be generated, at 212, command engine 106 automatically generates a command based on the machine ID, application name, and the rules. For example, the command may be a specific command selected from available commands and be composed of parameters that include the machine ID, application name, command name, and any extra parameters that were determined during the evaluation. The command may cause one or more actions to be performed on computing machine 104 as will be discussed below in more detail.

At 214, command engine 106 stores the command in command list 108. The command may not be pushed to computing machine 104. Rather, a query from computing machine 104 may need to be received for the command to be sent to computing machine 104.

Command List

Figure 3:
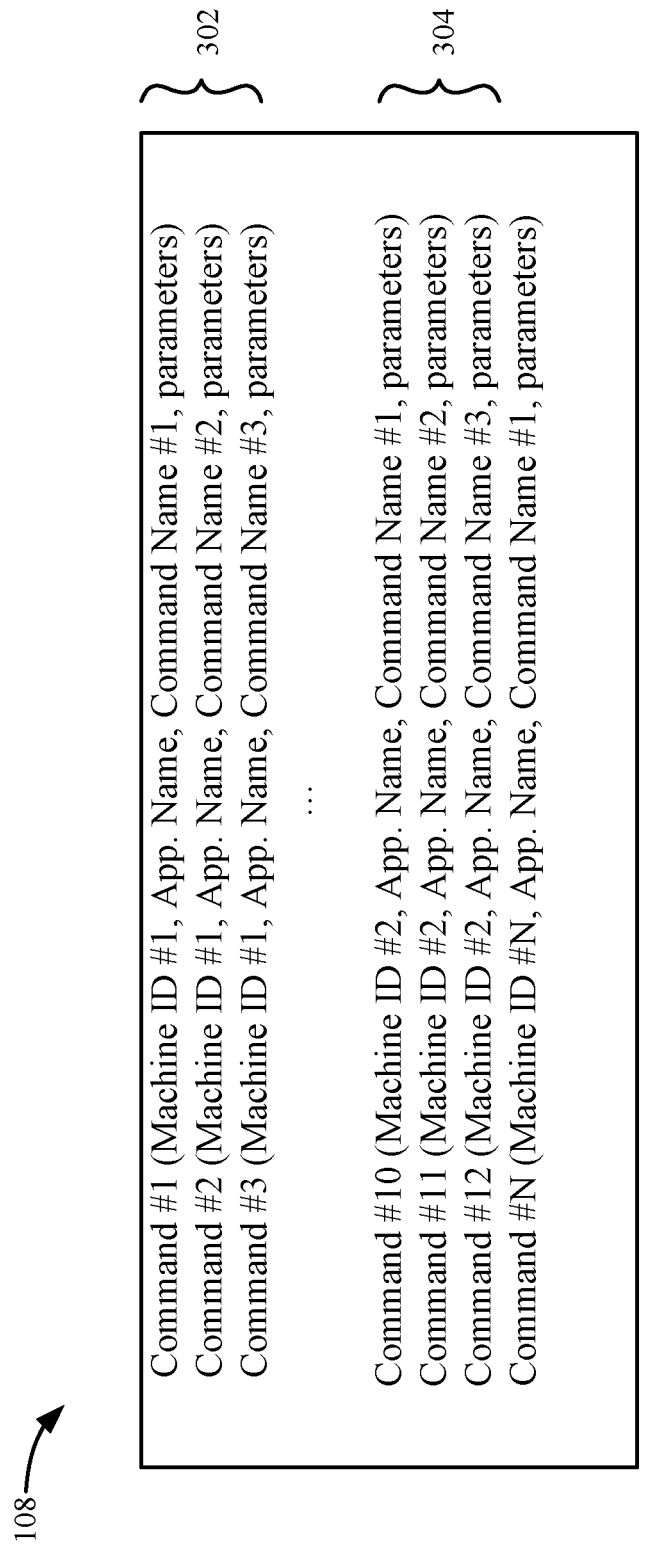
FIG. 3 depicts an example of a command list according to some embodiments.

FIG. 3 depicts an example of a command list 108 according to some embodiments. Command list 108 may include commands for multiple machine IDs. In other embodiments, there may be separate command lists 108 for each machine ID. Command list 108 may include any number of commands for any number of machine IDs. Also, command list 108 may be dynamically changing as command engine 106 receives issues and generates commands.

At 302, three commands #1, #2, and #3 are associated with machine ID #1. These commands may include different command names #1, #2, and #3. In this case, the commands may cause computing machine 104 with machine ID #1 to perform different actions for the same application name. However, in other examples, machine ID #1 may be associated with multiple commands for multiple applications that have experienced issues. The commands may also include any parameters that can be used by application 112 to collect telemetry information.

At 304, commands #10, #11, and #12 for another machine ID #2 are shown. These may be the same commands as described above or different commands. Also, the commands may be for the same application or for different applications.

Figure 4:
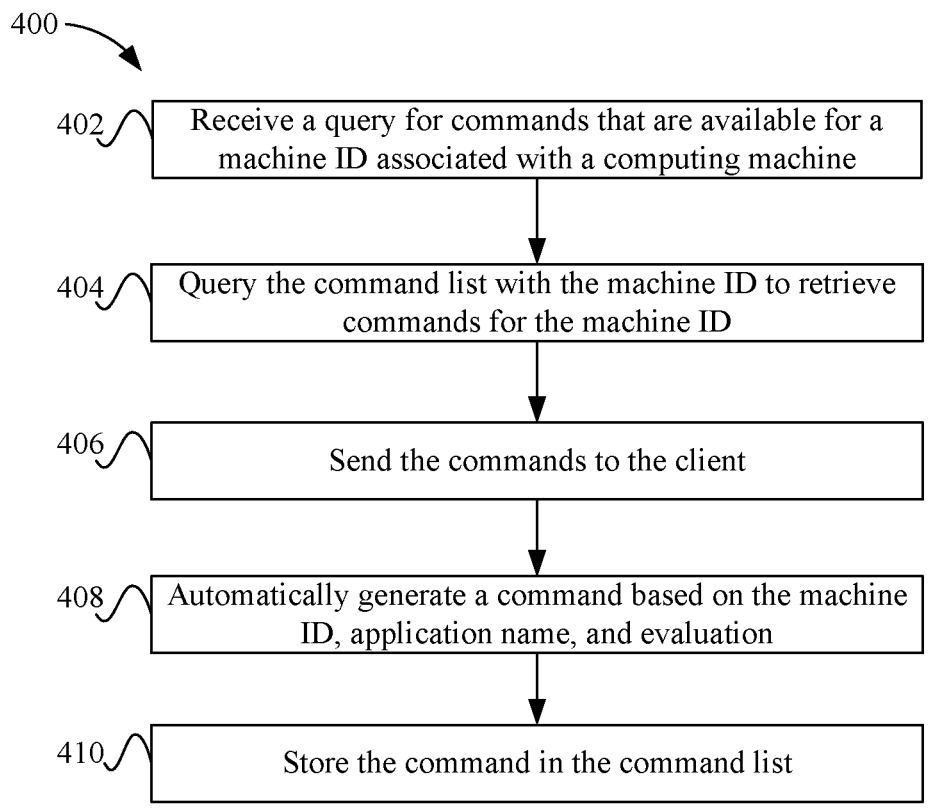
FIG. 4 depicts a simplified flowchart of a method for retrieving commands according to some embodiments.

When command engine 106 receives a request for commands from a computing machine 104, the request may include a machine ID. Then, command engine 106 may retrieve the commands for the machine ID from command list 108. For example, command engine 106 uses the machine ID as an index or argument in a query to retrieve the applicable commands from command list 108. FIG. 4 depicts a simplified flowchart 400 of a method for retrieving commands according to some embodiments. At 402, command engine 106 receives a query from computing machine 104 for commands that are available for a machine ID associated with the computing machine. Computing machine 104 may send the query periodically or the query may be triggered, such as when an issue occurs. Also, the query may be a general query by the operating system running on computing machine 104 for any commands and not related to any specific application 112 or the query may request commands for a specific application 112. In some examples, the provider may configure the operating system to perform the queries for the command list and command engine 106 leverages this feature in the operating system to change the operation of computing machines 104 to collect telemetry information. Then, at 404, command engine 106 queries the command list with the machine ID to retrieve commands for the machine ID. For example, referring to FIG. 3, if the machine ID is Machine ID #1, then command engine 106 retrieves the commands at 302.

At 406, command engine 106 sends the retrieved commands to the requesting computing machine 104. The method of sending the commands may be based on the query that is received. For example, the query may include information that allows command engine 106 to contact computing machine 104, such as the information may be an address for computing machine 104. Command engine 106 may then use the address to send the commands to computing machine 104. It is noted that command engine 106 may not have been able to send the commands previously to computing machine 104 because command engine 106 did not know the address for computing machine 104.

Command Execution

Figure 5:
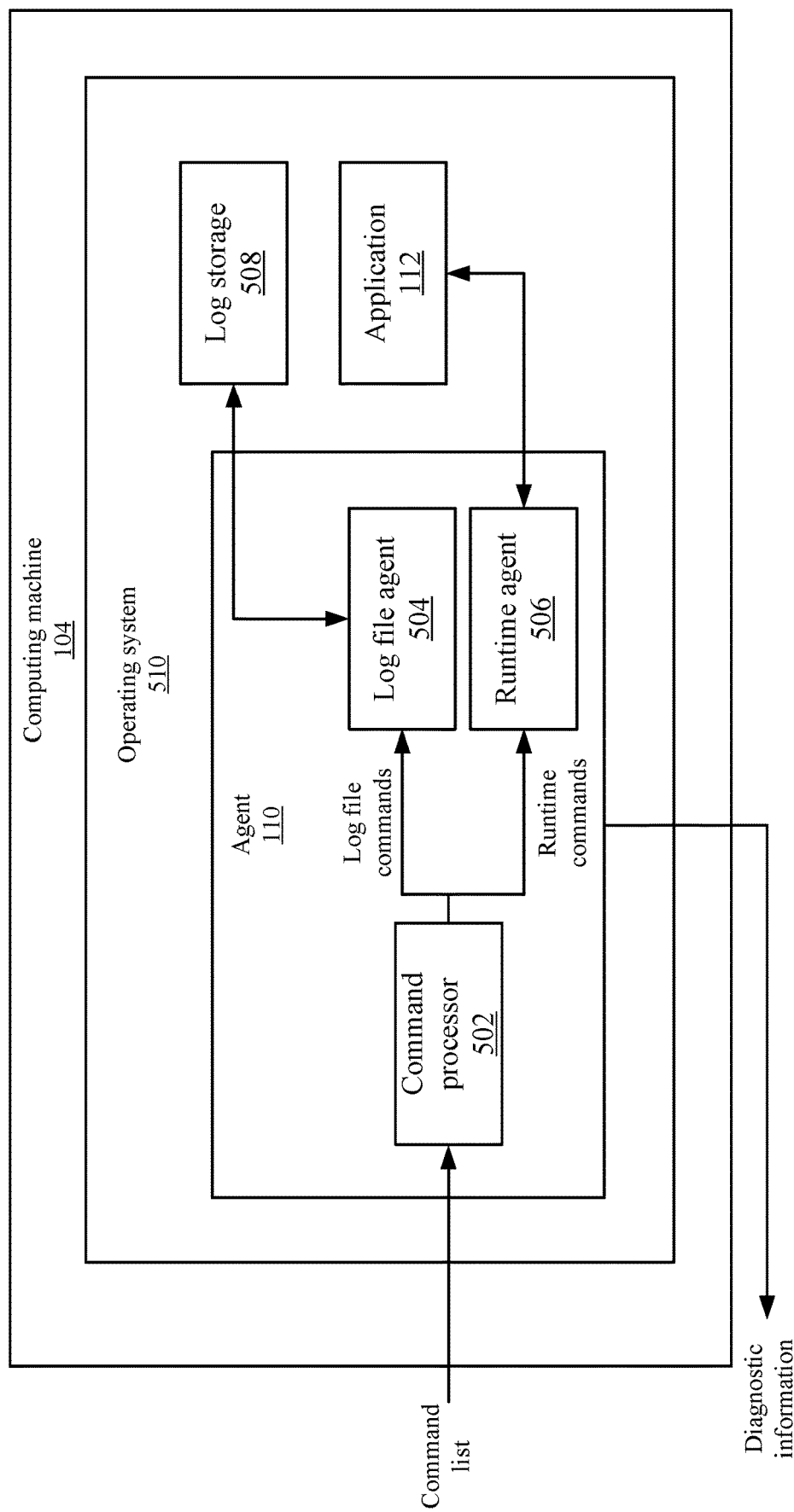
FIG. 5 depicts a more detailed example of a computing machine according to one embodiment.

Once receiving the commands, computing machine 104 may execute the commands to collect telemetry information for application 112. FIG. 5 depicts a more detailed example of computing machine 104 according to one embodiment. The actions of agent 110 may be performed without requiring a user to perform any actions. For example, agent 110 is run in the background of operating system 510 and triggered when computing machine 104 requests and receives the commands. In some embodiments, a user may opt-in to allow agent 110 to run in the background.

Agent 110 includes a command processor 502 that receives the command list in response to sending the query for the commands. Command processor 502 may then parse the command list to determine different types of commands that may be executed, such as runtime commands and log file commands. Command processor 502 sends the log file commands to a log file agent 504 and sends the runtime commands to a runtime agent 506. Log file agent 504 and runtime agent 506 may be associated with operating system 510, such as both agents may be shipped with operating system 510.

The different types of commands may perform different actions. For example, a log file command may cause log file agent 504 to perform actions related to retrieving stored information, such as from logs. Log file commands may retrieve information that has been saved based on the execution of application 112 and/or operating system 510. Also, runtime commands may cause runtime agent 506 to collect runtime information while application 112 is running on computing machine 104. The runtime commands dynamically collect information that application 112 generates during the execution.

Log file agent 504 may collect different types of logs. In some embodiments, log file agent 504 may collect operating system logs. For example, log file agent 504 may enable in-memory logging in log storage 508, which may be a circular buffer, that traces the operation of application 112. The logs may be based on operating system 510 tracing the events that occur when application 112 executes. Examples of events that may occur include application 112 closing for application quick-close issues. The log of events is stored to a log file for the operating system. Log file agent 504 may also collect application-specific logs. For example, each application may have its own specific data that is logged during execution. Log file agent 504 may use software tracing to trace the execution of application 112 to determine the application-specific events. The log of events is stored to a log file for the application.

Operating system 510 can invoke runtime agent 506 based on the runtime commands received. For example, the runtime commands may launch (or activate) runtime agent 506 when application 112 is launched and close (or deactivate) runtime agent 510 when application 112 is closed. Runtime agents 506 may include monitoring agents that can monitor the runtime execution of application 112. One example of runtime agent 506 is an application programming interface (API) logger that logs return codes of every operating system API call that application 112 invokes. This may be a good indicator of when/where an issue occurs. Although the above log file and runtime information is described, agent 110 may collect other telemetry information or telemetry for application 112.

Once collecting the telemetry information based on the commands, agent 110 sends the telemetry information to server system 102 or another telemetry device. In some examples, a trigger for sending the telemetry information may be based on a specific time, a periodic timer, events that occur on computing machine 104, such as an application closing quickly, a feedback application that allows a user to select a button to provide feedback information, or when agent 110 detects when an issue occurs.

Figure 6:
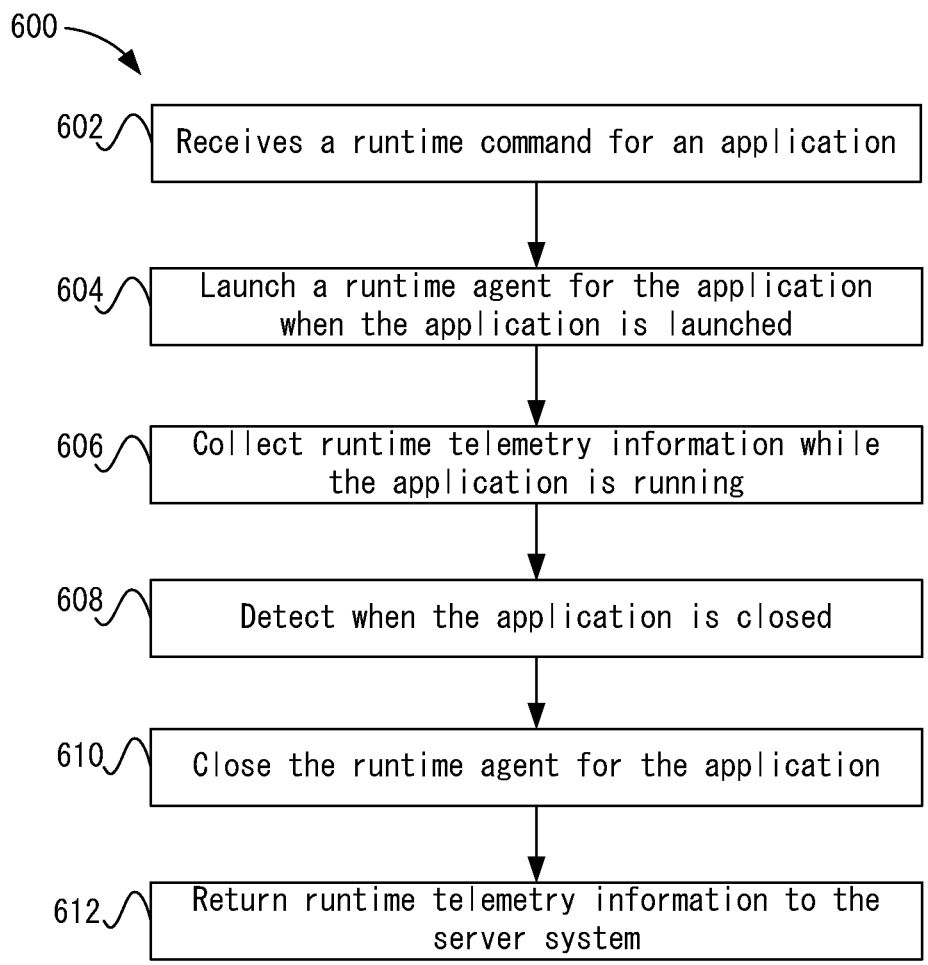
FIG. 6 depicts a simplified flowchart of a method for collecting runtime telemetry information according to some embodiments.

FIG. 6 depicts a simplified flowchart 600 of a method for collecting runtime telemetry information according to some embodiments. At 602, runtime agent 506 receives a runtime command for application 112. At 604, runtime agent 506 detects when application 112 is launched and then runtime agent 506 is launched for application 112. For example, operating system 510 may monitor when application 112 is launched and runtime agent 506 is launched when the launch of application 112 is detected.

At 606, runtime agent 506 collects runtime information while application 112 is running. The runtime information may be based on application 112 performing some actions during execution.

At 608, runtime agent 506 detects when application 112 is closed. Then, at 610, runtime agent 506 is closed. At 612, agent 110 either returns the runtime information to server system 102 or stores the information for later return.

Telemetry Information Evaluation

When server system 102 receives the information from agent 110, server system 102 can evaluate the telemetry information. In some embodiments, telemetry information is received from multiple computing machines 104. Also, the telemetry information may be anonymous and is not associated with a specific user. However, server system 102 can correlate the telemetry information to the original issue using the command name and machine ID. For example, the machine ID and command name may be used to look up the issue that caused the command to be generated. In some examples, the same command name for the application may have been provided to multiple computing machines 104. Server system 102 may aggregate the telemetry information from the multiple computing machines 104 for the issue. Then, server system 102 may evaluate the issue for application 112 based on the telemetry information. It is noted that due to the anonymous nature of the telemetry information, server system 102 may not troubleshoot the issue specifically on computing machine 104. That is, if a machine ID #1 sent back telemetry information, server system 102 does not attempt to fix this individual issue on that computing machine. Rather, the telemetry information is evaluated with other telemetry information for application 112 to troubleshoot the issues that have occurred with respect to application 112. Then, an update to application 112 may be issued to globally fix the issue.

CONCLUSION

Accordingly, some embodiments provide a dynamic process that can cause an application 112 to collect telemetry information. Using a function on computing machine 104 that causes agent 110 to send queries for commands to server system 102, server system 102 can cause a dynamic change to computing machine 104 without having to contact computing machine 104. Also, the commands may be used to collect telemetry information for a computing machine without knowing the user's identity. Rather, only machine ID and application name may be known for an issue. This keeps the user information anonymous. Rather, a response to the query received from computing machine 104 is used to change the behavior of computing machine 104.

Example Computer System

Figure 7:
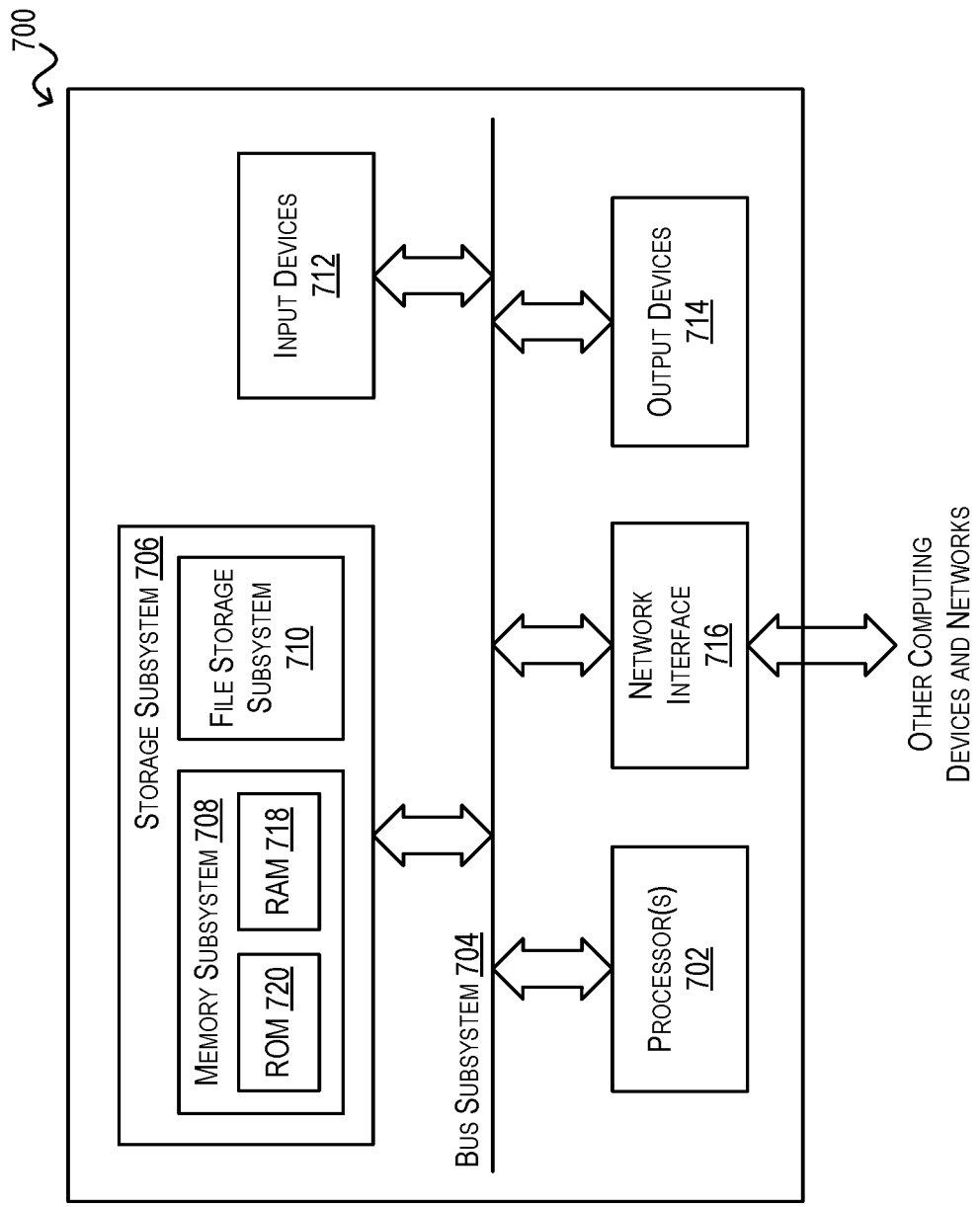
FIG. 7 depicts a simplified block diagram of an example computer system according to certain embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a bus subsystem 704. These peripheral devices include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 708 and 710 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   generate a command to cause a computing machine to collect information for an issue that occurred with an application that is running on the computing machine;
   store the command in a command list, the command being associated with a computing machine identifier for the computing machine;
   receive a query from the computing machine that is running the application for the command list, the query including the computing machine identifier;
   upon receiving the query:

locate the command in the command list based on the command being associated with the computing machine identifier; and send the command to the computing machine that is running the application, wherein the command dynamically causes the computing machine to collect the information for the issue with the application.

2. The computer system of claim 1, wherein the program code further causes the processor to:

analyze the issue with the application, wherein the command is automatically generated based on the analyzing of the issue.

3. The computer system of claim 2, wherein the program code further causes the processor to:

generate one or more parameters for the command based on the analyzing, wherein the one or more parameters configure the computing machine to collect the information.

4. The computer system of claim 1, wherein the command causes the computing machine to collect the information using an operating system that is executing the application.

5. The computer system of claim 1, wherein the information comprises a log file for the application.

6. The computer system of claim 1, wherein the command causes the computing machine to collect the information during runtime of the application when the application in running on the computing machine.

7. The computer system of claim 1, wherein the command causes an agent to be launched on the computing machine to collect the information from the application while the application is running on the computing machine.

8. The computer system of claim 7, wherein the agent is enabled while the application is running and disabled upon the application being closed.

9. The computer system of claim 1, wherein:

the command list comprises a plurality of commands for a plurality of computing machines, wherein the plurality of commands are associated with a plurality of computing machine identifiers, and the command is located in the plurality of commands using the computing machine identifier included in the query.

10. The computer system of claim 9, wherein commands in the plurality of commands that are not associated with the computing machine identifier are not sent to the computing machine that sent the query.

11. The computer system of claim 1, wherein the computing machine is configured to send the query for the command list without receiving a request from the computer system to send the query.

12. The computer system of claim 1, wherein the computing machine is configured to send the query for the command list based on a recurring schedule.

13. The computer system of claim 1, wherein an operating system in which the application is installed is configured to send the query for the command list.

14. The computer system of claim 1, wherein the program code further causes the processor to:

upon sending the command to the computing machine, remove the command from the command list.

15. The computer system of claim 1, wherein the program code further causes the processor to:

receive the information for the issue; and aggregate the information for the issue with other information received from other computing machines that were sent the command and returned the other information upon executing the command.

16. The computer system of claim 1, wherein the computer system does not receive user identification information for the issue.

17. A method comprising:

generating, by a computing device, a command to cause a computing machine to collect information for an issue that occurred with an application that is running on the computing machine;

storing, by the computing device, the command in a command list, the command being associated with a computing machine identifier for the computing machine;

receiving, by the computing device, a query from the computing machine that is running the application for the command list, the query including the computing machine identifier;

upon receiving the query:

locating, by the computing device, the command in the command list based on the command being associated with the computing machine identifier; and sending, by the computing device, the command to the computing machine that is running the application, wherein the command dynamically causes the computing machine to collect the information for the issue with the application.

18. The method of claim 17, wherein the command causes the computing machine to collect the information using an operating system that is executing the application.

19. The method of claim 17, wherein the command causes an agent to be launched on the computing machine to collect the information from the application while the application is running on the computing machine.

20. A non-transitory computer readable storage medium having stored thereon program code executable by a computer system, the program code causing the computer system to:

generate a command to cause a computing machine to collect information for an issue that occurred with an application that is running on the computing machine;

store the command in a command list, the command being associated with a computing machine identifier for the computing machine;

receive a query from the computing machine that is running the application for the command list, the query including the computing machine identifier;

upon receiving the query:

locate the command in the command list based on the command being associated with the computing machine identifier; and send the command to the computing machine that is running the application, wherein the command dynamically causes the computing machine to collect the information for the issue with the application.

* * * * *